US010093222B2

(12) United States Patent
Uesugi et al.

(10) Patent No.: US 10,093,222 B2
(45) Date of Patent: Oct. 9, 2018

(54) VEHICLE LAMP AND VEHICLE LAMP SYSTEM

(71) Applicants: Koito Manufacturing Co., Ltd., Tokyo (JP); TOYOTA JIDOSHA KABUSHIKI KAISHA, Toyota-shi, Aichi-ken (JP)

(72) Inventors: Atsushi Uesugi, Shizuoka (JP); Hideki Uchida, Shizuoka (JP); Kiyotaka Mochizuki, Shizuoka (JP); Tatsuya Takagaki, Nisshin (JP); Takuya Murakami, Shizuoka (JP)

(73) Assignees: KOITO MANUFACTURING CO., LTD., Tokyo (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/214,486

(22) Filed: Jul. 20, 2016

(65) Prior Publication Data

US 2017/0057402 A1    Mar. 2, 2017

(30) Foreign Application Priority Data

Aug. 27, 2015   (JP) .................................. 2015-167921

(51) Int. Cl.
*B60Q 1/02*     (2006.01)
*B60Q 1/14*     (2006.01)
*B60Q 1/12*     (2006.01)

(52) U.S. Cl.
CPC .............. *B60Q 1/1423* (2013.01); *B60Q 1/12* (2013.01); *B60Q 1/143* (2013.01); *B60Q 2300/054* (2013.01); *B60Q 2300/056* (2013.01); *B60Q 2300/112* (2013.01); *B60Q 2300/122* (2013.01); *B60Q 2300/322* (2013.01); *B60Q 2300/41* (2013.01); *B60Q 2300/42* (2013.01)

(58) Field of Classification Search
CPC ......................... H05B 33/0815; H05B 33/083; B60Q 1/1407; B60Q 1/143; B60Q 2300/322; B60Q 2300/41
USPC ............................................ 315/77, 82, 291
See application file for complete search history.

(56) References Cited

U.S. PATENT DOCUMENTS

| | | | | |
|---|---|---|---|---|
| 5,604,406 A | * | 2/1997 | Gaus | ...................... H05B 41/00 315/200 A |
| 2004/0155844 A1 | * | 8/2004 | Stopa | .................. H05B 33/0815 345/82 |

(Continued)

FOREIGN PATENT DOCUMENTS

| | | |
|---|---|---|
| CN | 101152848 A | 4/2008 |
| CN | 103192759 A | 7/2013 |

(Continued)

*Primary Examiner* — Tung X Le

(57) ABSTRACT

A vehicle lamp system includes a lamp unit and a lamp control unit. The lamp unit includes a plurality of LEDs and forms a high-beam light-distribution pattern. The lamp control unit controls the on/off of each of the plurality of LEDs. The lamp control unit controls each LED in the following manner. Specifically, the luminance is gradually lowered in a first period when the luminance is lowered to a level at which the LED remains on at reduced luminance. The luminance is gradually lowered in a second period, which is shorter than the first period, when the luminance is lowered to a level at which the LED is off.

5 Claims, 6 Drawing Sheets

(56) References Cited

U.S. PATENT DOCUMENTS

| | | | |
|---|---|---|---|
| 2006/0108932 A1* | 5/2006 | Yamazaki | B60Q 1/143 315/82 |
| 2015/0042225 A1 | 2/2015 | Fukayama | |
| 2015/0353001 A1* | 12/2015 | Fukui | B60Q 1/04 315/82 |
| 2016/0262232 A1* | 9/2016 | Fukui | B60Q 1/04 |
| 2017/0008447 A1* | 1/2017 | Fukui | B60Q 1/1407 |
| 2017/0151962 A1* | 6/2017 | Takagi | B61D 29/00 |

FOREIGN PATENT DOCUMENTS

| JP | 2008037240 A | 2/2008 |
|---|---|---|
| JP | 2008-137516 A | 6/2008 |
| JP | 2014159253 A | 9/2014 |

* cited by examiner

VEHICLE LAMP AND VEHICLE LAMP SYSTEM

BACKGROUND OF THE INVENTION

1. Field of the Invention

The present invention relates to vehicle lamps and vehicle lamp systems used in automobiles or the like.

2. Description of the Related Art

Typically, a vehicle lamp can switch between a low beam and a high beam. The low beam illuminates a close range at a predetermined illuminance. Light-distribution patterns of the low beam are regulated so as not to cause glare to oncoming vehicle or leading vehicle, and the low beam is used mainly when the vehicle travels in a city area. Meanwhile, the high beam illuminates a distant, broad range in front at a relatively high illuminance and is used mainly when the vehicle travels at high speed on a road with little oncoming vehicle or little leading vehicle. Thus, the high beam provides better visibility for the driver than the low beam does but disadvantageously causes glare to a driver of a leading vehicle or of an oncoming vehicle or to a pedestrian.

In recent years, a technique for dynamically and adaptively controlling a high-beam light-distribution pattern based on conditions surrounding a vehicle has been proposed (see, for example, JP2008-137516). According to this technique, the presence of a leading vehicle, an oncoming vehicle, or a pedestrian is detected, and light in a region corresponding to the detected vehicle or pedestrian is attenuated so as to reduce glare to the vehicle or pedestrian.

Typically, in a conventional vehicle lamp system, regardless of whether the luminance is lowered to a level at which the lamp remains on at reduced luminance or to a level at which the lamp is off in order to reduce glare to a vehicle or a pedestrian, the luminance is gradually lowered to target luminance indiscriminately in the same period of time. This may be preferable in terms of simplifying control but leaves room for improvement in terms of the comfort for the driver.

SUMMARY OF THE INVENTION

The present invention has been made in view of such a situation and is directed to providing a vehicle lamp system that can improve comfort for a driver.

In order to solve the problem described above, a vehicle lamp system according to an aspect of the present invention includes a lamp unit that can combine light beams from a plurality of light-emitting elements to form a high-beam light-distribution pattern, and a control unit that controls the on/off state of each of the plurality of light-emitting elements. The control unit controls each light-emitting element such that luminance thereof is gradually lowered in a first period when the luminance is lowered to a level at which the light-emitting element is off and controls each light-emitting element such that luminance thereof is gradually lowered in a second period, which is longer than the first period, when the luminance is lowered to a level at which the light-emitting element remains on at reduced luminance.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

Figure 1:
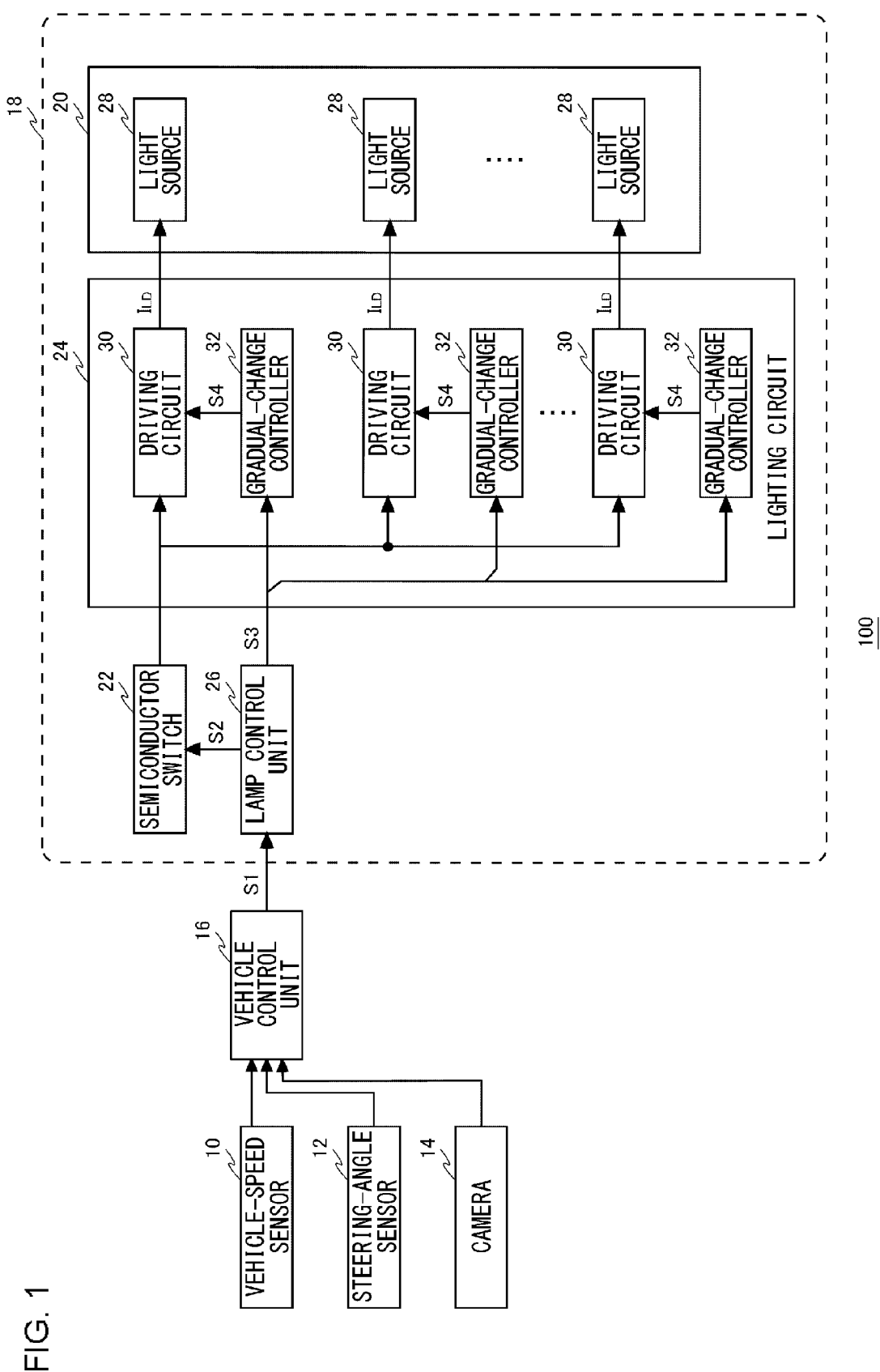
FIG. 1 is a block diagram of a vehicle lamp system according to an embodiment.

FIG. 1 is a block diagram of a vehicle lamp system 100 according to an embodiment. The vehicle lamp system. 100 includes a vehicle-speed sensor 10, a steering-angle sensor 12, a camera 14, a vehicle control unit 16, and a vehicle lamp 18.

The vehicle-speed sensor 10 detects the rotational speed of the wheels to thus detect the speed of the vehicle. The steering-angle sensor 12 detects the steering angle of the steering wheel. The camera 14 captures an image of an area in front of the vehicle.

The vehicle control unit 16 controls the vehicle as a whole. The vehicle control unit 16 detects the presence of a leading vehicle or an oncoming vehicle and the position of the detected vehicle based on the image information acquired by the camera 14. On the basis of this detection result, the vehicle speed information, and the steering angle information, the vehicle control unit 16 determines a light-distribution pattern that is formed by a combination of an on-region that is to be illuminated with a light beam and an off-region (blocked region) that is not to be illuminated with a light beam. The vehicle control unit 16 transmits, to the vehicle lamp 18, a pattern instruction S1 indicating the determined light-distribution pattern.

The vehicle lamp 18 forms a high-beam light-distribution pattern. The actual vehicle lamp 18 is equipped with, in addition to a high beam, an additional high beam for illuminating a farther range, a low beam, a clearance lamp, and so on, but these are omitted herein.

The vehicle lamp 18 includes a lamp unit 20, a semiconductor switch 22, a lighting circuit 24, and a lamp control unit 26. The actual vehicle lamp system 100 is provided with a pair of right and left vehicle lamps 18, but only one of the two is shown herein.

The lamp unit 20 includes a plurality of semiconductor light sources (e.g., LEDs) 28 that can be turned on/off individually. Each LED 28 is turned on upon a driving current ILD being supplied thereto.

The semiconductor switch 22 is provided on a path through which power is supplied from a battery (not illustrated) to the lighting circuit 24, and the on/off of the semiconductor switch 22 is controlled in accordance with a control signal S2 from the lamp control unit 26. The semiconductor switch 22 is on when the LEDs 28 are on.

The lamp control unit 26 controls the on/off of the plurality of LEDs 28 individually based on the pattern instruction S1. In the present embodiment, the lamp control unit 26 selects, for each of the plurality of LEDs 28, one of a first mode, a second mode, and a third mode in which the luminance is to be gradually changed, and generates an on/off instruction signal S3 instructing that each LED 28 be turned on or off in the selected mode.

The lamp control unit 26 selects the first mode when an LED 28 is to be turned off. In the first mode, the luminance is gradually lowered so that the luminance reaches a level at which the LED 28 is off (i.e., the luminance is 0) in a first period (i.e., the LED 28 is gradually turned off). In one example, the first period is 300 msec. When the vehicle is traveling at high speed, the first period may be 500 msec. This can prevent a situation in which reflection plates are mistaken as a leading vehicle and the luminance is changed frequently.

The lamp control unit 26 selects the second mode when an LED 28 is to remain on at reduced luminance. In the second mode, the luminance is gradually lowered so that the luminance reaches target luminance at which the LED 28 remains on at reduced luminance in a second period, which is longer than the first period. In one example, the second period is 400 msec. When the vehicle is traveling at high speed, the second period may be 7000 msec, for the same reason as the one described above.

The lamp control unit 26 selects the third mode when an LED 28 is to remain on at increased luminance. In the third mode, the luminance is gradually raised from a level at which the LED 28 is off or on to target luminance at which the LED 28 is on at increased luminance in the second period as in the second mode.

The lighting circuit 24 includes driving circuits 30 and gradual-change controllers 32 that are provided for the respective LEDs 28. The driving circuits 30 supply, to the LEDs 28, driving currents ILD corresponding to respective light-control signals S4. Each driving circuit 30 may perform both analog light control of adjusting the amount of the driving current ILD and pulse-width modulation (PWM) light control of varying the duty cycle of the driving current ILD by switching the driving current ILD at high speed or may perform only one of the two.

Each gradual-change controller 32 generates a light-control signal S4 that gradually changes over time in accordance with an on/off instruction signal S3 from the lamp control unit 26. Specifically, upon the first mode being selected, the gradual-change controller 32 causes the light-control signal S4 to change relatively steeply in a direction in which the driving current ILD decreases. Upon the second mode being selected, the gradual-change controller 32 causes the light-control signal S4 to change gently over time in a direction in which the driving current ILD decreases. Upon the third mode being selected, the gradual-change controller 32 causes the light-control signal S4 to change gently over time in a direction in which the driving current ILD increases.

Figure 2:
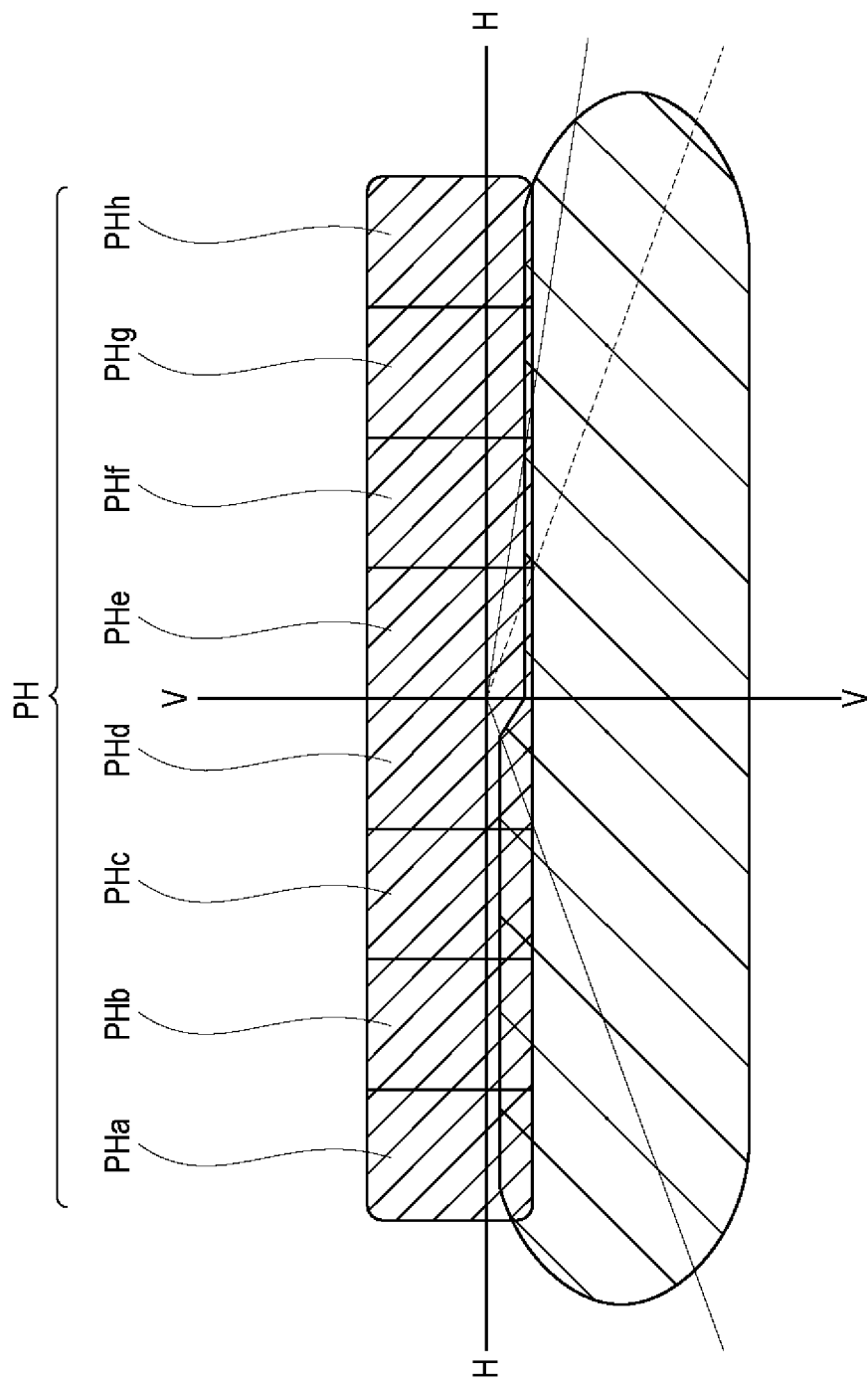
FIG. 2 schematically illustrates a light-distribution pattern formed by the vehicle lamp system.
Figure 3A:
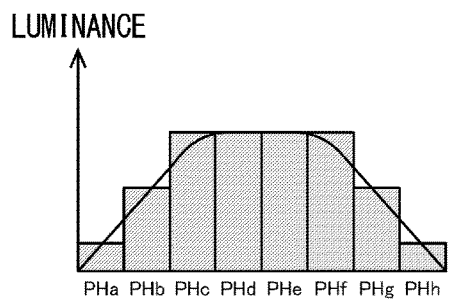
FIGS. 3A through 3H illustrate an example of a change in the luminance distribution of each partial region of a high-beam light-distribution pattern.
Figure 3B:
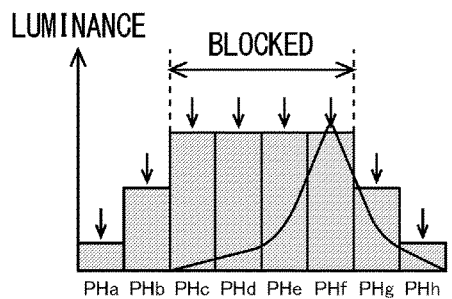
Figure 3C:
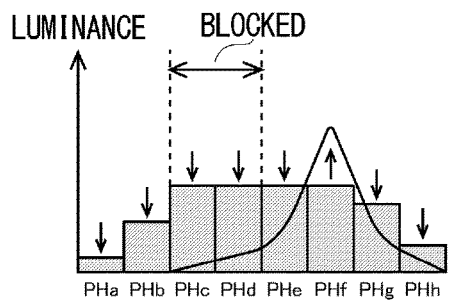
Figure 3D:
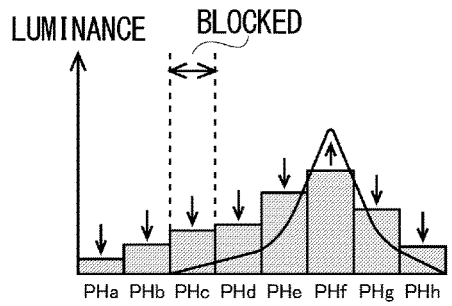
Figure 3E:
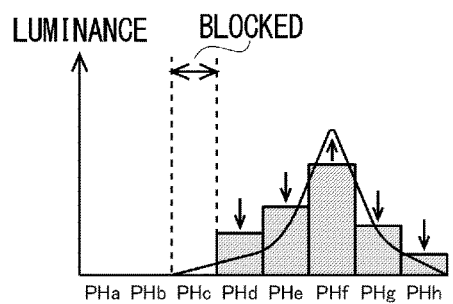
Figure 3F:
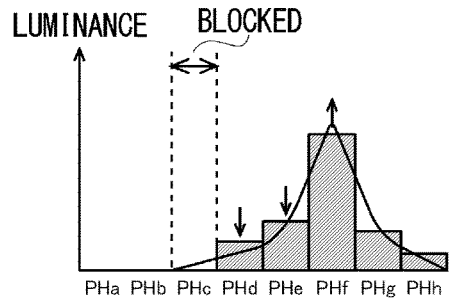
Figure 3G:
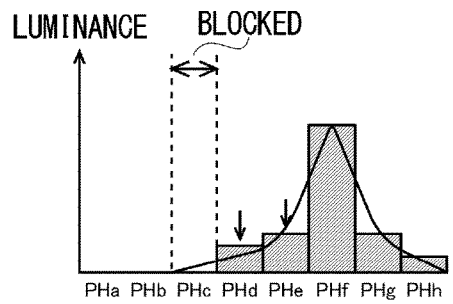
Figure 3H:
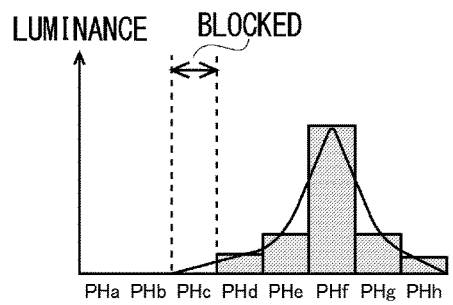

FIG. 2 schematically illustrates a light-distribution pattern formed by the vehicle lamp system 100 configured as described above. FIG. 2 illustrates a light-distribution pattern formed on a virtual vertical screen disposed at a predetermined position in front of the lamp, for example, at a position 25 meters ahead of the lamp.

A light-distribution pattern PH is a high-beam light-distribution pattern formed by illumination light of the lamp unit 20. The light-distribution pattern PH is divided into a plurality of (eight herein) partial regions PHa through PHh, and the partial regions correspond to the respective LEDs 28. In other words, the vehicle lamp 18 can form, in an area in front of the vehicle, the high-beam light-distribution pattern PH consisting of the plurality of partial regions PHa through PHh corresponding to the illumination regions of the respective LEDs 28.

Figure 4:
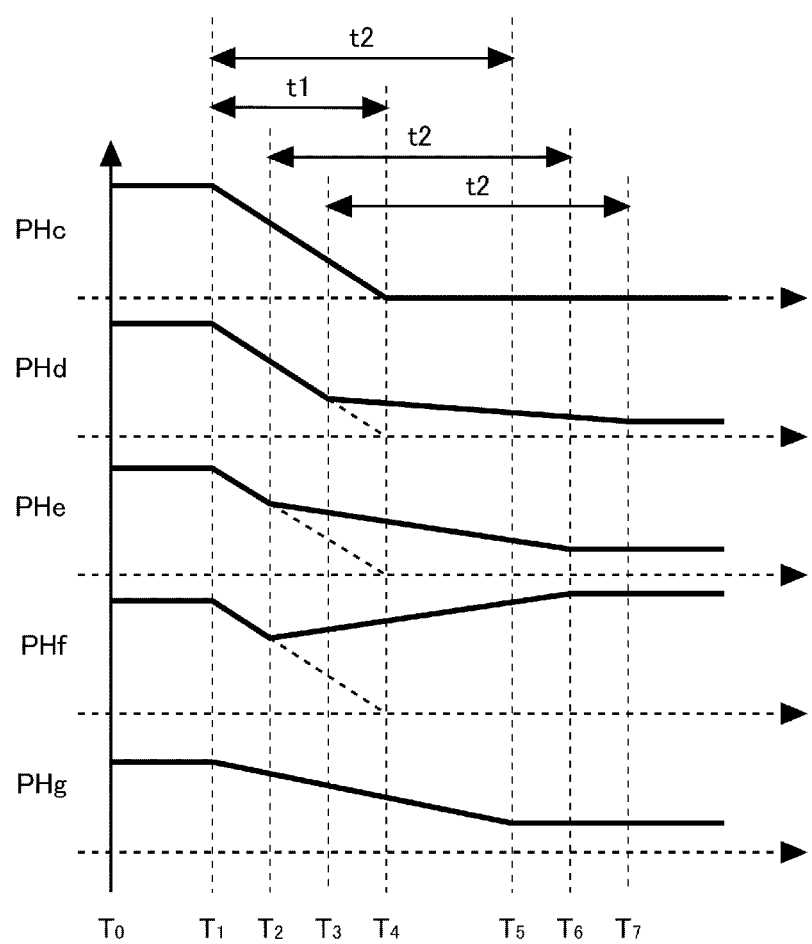
FIG. 4 is a timing chart illustrating a change over time in the luminance of each partial region.

FIGS. 3A through 3H illustrate an example of a change in the luminance distribution of each of the partial regions PHa through PHh. FIGS. 3A through 3H illustrate the luminance distributions at times $T_0$ through $T_7$, respectively. In FIGS. 3A through 3H, the longer a given bar is, the higher is the luminance of its corresponding partial region. In other words, the longer a given bar is, the higher is the luminance of the LED 28 that illuminates the corresponding partial region. FIG. 4 is a timing chart illustrating changes over time in the luminance of the partial regions PHb through PHf among the partial regions illustrated in FIGS. 3A through 3H, or in other words, changes over time in the luminance of the LEDs 28 that illuminate the respective partial regions PHb through PHf. An exemplary case will be described hereinafter. Specifically, at the time $T_1$, a target light-distribution pattern is changed, a leading vehicle is detected in the partial regions PHc through PHf, and the partial regions PHc through PHf are set as blocked regions. At the time $T_2$, the leading vehicle ceases to be detected in the partial regions PHe and PHf, and the partial regions PHe and PHf are set as on-regions. At the time $T_3$, the leading vehicle ceases to be detected in the partial region PHd, and the partial region PHd is set as an on-region.

The luminance of the partial regions PHa and PHb is gradually lowered to a level at which the LEDs 28 are off as the target light-distribution pattern has been changed at the time $T_1$. In addition, the luminance of the partial region PHc is gradually lowered to a level at which the LED 28 is off as the partial region PHc has been set as a blocked region at the time $T_1$. In other words, the luminance of the LEDs 28 corresponding to the respective partial regions PHa through PHc is gradually lowered in the first mode (i.e., the LEDs 28 are gradually turned off in a first period t1).

The luminance of the partial region PHd starts being gradually lowered to a level at which the LED 28 is off as the partial region PHd has been set as a blocked region at the time $T_1$. In other words, the luminance of the LED 28 corresponding to the partial region PHd starts being gradually lowered in the first mode (i.e., the LED 28 starts being gradually turned off in the first period t1). Then, as the partial region PHd has been set as an on-region at the time $T_3$, the luminance of the partial region PHd is gradually lowered to a level at which the LED 28 is on at luminance corresponding to the target light-distribution pattern. In other words, the luminance of the LED 28 corresponding to the partial region PHd is gradually lowered to target luminance in the second mode (i.e., the luminance is gradually lowered in a second period t2).

The luminance of the partial region PHe starts being gradually lowered to a level at which the LED 28 is off as the partial region PHe has been set as a blocked region at the time $T_1$. In other words, the luminance of the LED 28 corresponding to the partial region PHe starts being gradually lowered in the first mode. Then, as the partial region PHe has been set as an on-region at the time $T_2$, the luminance of the partial region PHe is gradually lowered to a level at which the LED 28 is on at luminance corresponding to the target light-distribution pattern. In other words, the luminance of the LED 28 corresponding to the partial region PHe is gradually lowered to target luminance in the second mode.

The luminance of the partial region PHf starts being gradually lowered to a level at which the LED 28 is off as the partial region PHf has been set as a blocked region at the time $T_1$. In other words, the luminance of the LED 28 corresponding to the partial region PHf starts being gradually lowered in the first mode. Then, as the partial region PHf has been set as an on-region at the time $T_2$, the luminance of the partial region PHf is gradually raised to a level at which the LED is on at luminance corresponding to the target light-distribution pattern. In other words, the luminance of the LED 28 corresponding to the partial region PHf is gradually raised to target luminance in the third mode (i.e., the luminance is gradually raised in the second period t2).

The luminance of the partial regions PHg and PHh is gradually lowered to a level at which the LEDs 28 are on at luminance corresponding to the target light-distribution pattern as the target light-distribution pattern has been changed at the time $T_1$. In other words, the luminance of the LEDs 28 corresponding to the partial regions PHg and PHh is gradually lowered in the second mode.

As can be seen clearly from the timing charts for the partial regions PHc and PHg, the luminance is gradually changed in the first mode (i.e., in a relatively short period of time) when an LED 28 is to be gradually turned off, and the luminance is gradually changed in the second mode (i.e., in a relatively long period of time) when an LED 28 is to remain on at reduced luminance. In addition, as can be clearly seen from the timing charts for the partial regions PHe and PHf, regardless of whether the luminance is lowered or raised, the luminance is gradually changed in the same period of time when the luminance is to be changed to a level at which an LED 28 is on. In addition, as can be clearly seen from the timing charts for the partial regions PHd through PHf, when the luminance is to be changed to a level at which an LED 28 is on, such a change in the luminance ends in the order in which the change has started.

Figure 5A:
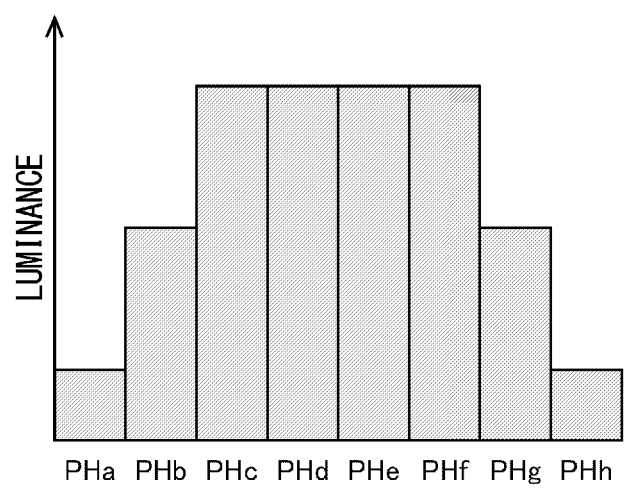
FIGS. 5A and 5B illustrate another example of a change in the luminance distribution of each partial region of a high-beam light-distribution pattern.
Figure 5B:
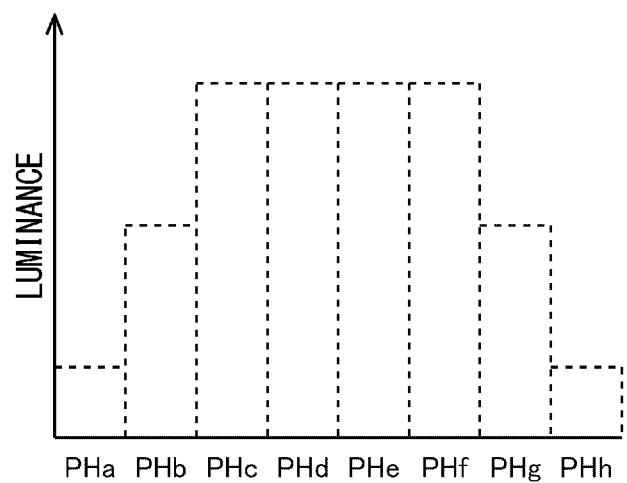

FIGS. 5A and 5B illustrate another example of a change in the luminance distribution of each of the partial regions PHa through PHh of the light-distribution pattern PH. This example illustrates a case in which the light-distribution pattern is changed from the state illustrated in FIG. 5A to the all-off state illustrated in FIG. 5B when all of the LEDs 28 are turned off. The luminance of all of the partial regions PHa through PHh is gradually lowered to a level at which the LEDs 28 are off. That is, the luminance of the LEDs 28 corresponding to the respective partial regions PHa and PHh is gradually lowered in the first mode. In other words, the luminance of all of the partial regions becomes 0 in the first period (i.e., at substantially the same timing).

Figure 6:
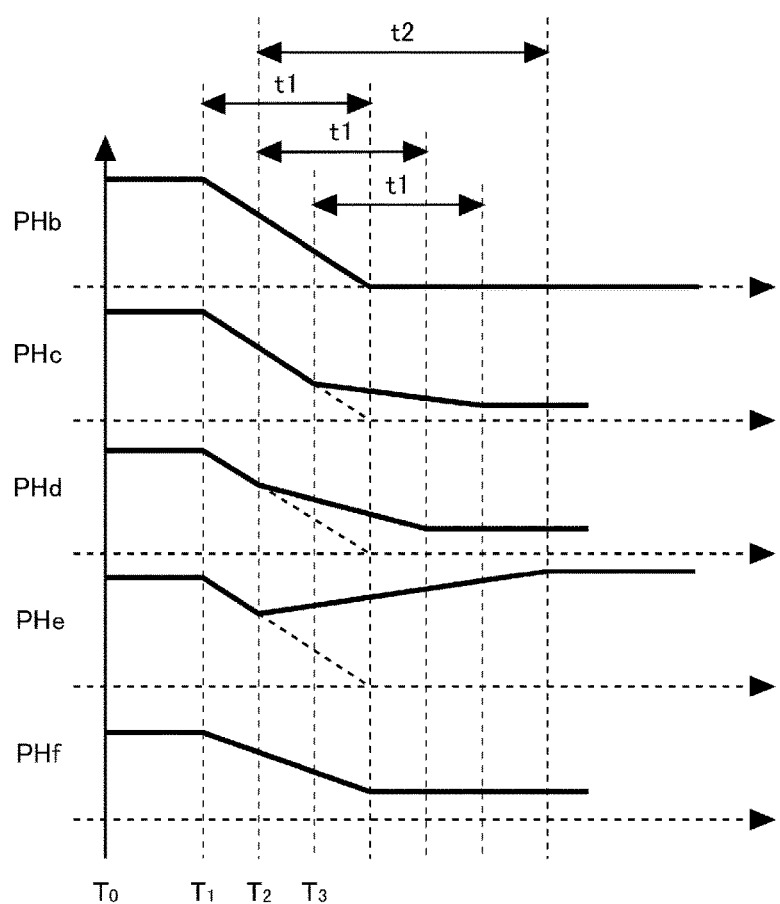
FIG. 6 is a timing chart illustrating a change over time in the luminance of each partial region of a high-beam light-distribution pattern formed by a vehicle lamp system according to a comparative example.

FIG. 6 is a timing chart illustrating an example of changes over time in the luminance of partial regions PHa through PHh of a high-beam light-distribution pattern PH formed by a vehicle lamp system according to a comparative example to be compared with the vehicle lamp system 100, or in other words, changes over time in the luminance of LEDs illuminating the respective partial regions PHb through PHf. FIG. 6 corresponds to FIG. 4. In the vehicle lamp system according to the comparative example, regardless of whether an LED is to be gradually turned off or the luminance of an LED is to be gradually lowered to a level at which the LED remains on at reduced luminance, the luminance is gradually lowered in a first period t1. Meanwhile, when the luminance is to be gradually raised to a level at which the LED is on at increased luminance, the luminance is gradually raised in a second period t2.

As can be seen clearly from the timing charts for the partial regions PHb and PHf, in the vehicle lamp system according to the comparative example, when the luminance of an LED is to be gradually lowered to a level at which the LED remains on, the luminance is gradually lowered in a relatively short period of time, as in the case in which the luminance of an LED is gradually lowered to a level at which the LED is off. Therefore, the brightness in an area in front of the vehicle changes rapidly. In addition, as can be clearly seen from the timing charts for the partial regions PHc through PHe, in the vehicle lamp system according to the comparative example, when the luminance is to be changed to a level at which an LED is on, the luminance is changed to reach target luminance in different periods when the luminance is raised and when the luminance is lowered. In particular, the luminance is gradually changed in a relatively short period of time when the luminance is lowered, and the luminance is gradually changed in a relatively long period of time when the luminance is raised. Therefore, the gradual decrease in the luminance of the partial region PHc that has started later ends before the gradual increase in the luminance of the partial region PHe that has started earlier.

Hereinafter, in light of the foregoing, advantageous effects of the vehicle lamp system 100 according to the embodiment will be described. With the vehicle lamp system 100 according to the embodiment, the lamp control unit 26 selects the first mode when the luminance of an LED 28 is to be gradually lowered to a level at which the LED 28 is off (i.e., the LED 28 is gradually turned off). In the meantime, the lamp control unit 26 selects the second mode when the luminance of an LED 28 is to be gradually lowered to a level at which the LED 28 remains on at reduced luminance. In other words, although the luminance is lowered in both cases, when an LED 28 is turned off, the luminance is gradually changed in a relatively short period of time. Accordingly, glare to a driver of a leading vehicle or of an oncoming vehicle or to a pedestrian can be suppressed. On the other hand, the luminance is gradually changed in a relatively long period of time when the luminance is gradually lowered to a level at which the LED 28 remains on, and thus a rapid change in the brightness in an area in front of the vehicle as in the case of the comparative example can be prevented. Thus, the comfort for the driver can be improved.

In addition, with the vehicle lamp system 100 according to the embodiment, when the luminance of an LED 28 is to be raised to a level at which the LED 28 remains on at increased luminance, the lamp control unit 26 raises the luminance in a period that is substantially the same as in the case in which the luminance of an LED 28 is lowered to a level at which the LED 28 remains on at reduced luminance. In other words, regardless of whether the luminance is raised or lowered, when the luminance is changed to a level at which an LED 28 remains on, the luminance is gradually changed to reach target luminance in substantially the same period of time. Accordingly, a sense of discomfort that a driver could have when the luminance is gradually changed to reach the target luminance in different periods of time as in the comparative example can be suppressed.

Thus far, the present invention has been described on the basis of an embodiment. This embodiment, however, is merely illustrative, and it should be appreciated by a person skilled in the art that various modifications can be made to the combinations of the components and the processing processes of the embodiment and that such modifications also fall within the scope of the present invention. Hereinafter, such modifications will be described.

(First Modification)

In the embodiment, a case in which, when the luminance is changed to a level at which an LED is on, the luminance is controlled to reach target luminance in the second period has been described. Alternatively, when the luminance is changed to a level at which an LED is on while the vehicle is traveling along a curve (i.e., when the steering angle is equal to or higher than a predetermined value), the luminance may be controlled to reach the target luminance in a third period, which is longer than the first period and equal to or shorter than the second period. In one example, while the vehicle is traveling along a curve, the third period may be 200 msec, and the second period may be 200 msec. In other words, while the vehicle is traveling along a curve, the luminance may be controlled to reach target luminance in a relatively short period of time. In this case, the traveling direction can be illuminated faster.

The present invention has been described on the basis of embodiments with the use of specific terms, but the embodiments merely illustrate the principle and the applications of the present invention, and a number of modifications of the embodiments and changes in the arrangement can be made within a scope that does not depart from the spirit of the present invention set forth in the claims.

A vehicle lamp system according to an aspect of the present invention includes a lamp unit that can combine light beams from a plurality of light-emitting elements to form a high-beam light-distribution pattern, and a control unit that controls on/off of each of the plurality of light-emitting elements. The control unit controls each light-emitting element such that luminance thereof is gradually lowered in a first period when the luminance is lowered to a level at which the light-emitting element is off and controls each light-emitting element such that luminance thereof is gradually lowered in a second period, which is longer than the first period, when the luminance is lowered to a level at which the light-emitting element remains on at reduced luminance.

According to this aspect, although the luminance is gradually lowered in both cases, when the luminance is lowered to a level at which the light-emitting element remains on at reduced luminance, the luminance is gradually lowered in a longer period of time than in a case in which the luminance is reduced to a level at which the light-emitting element is off.

The vehicle lamp system may further include a detection unit that detects a forward vehicle. When the detection unit has detected a forward vehicle, the control unit may control, among the plurality of light-emitting elements, a light-emitting element that illuminates the forward vehicle such that luminance thereof is gradually lowered to a level at which the light-emitting element is off in the first period. Accordingly, when the luminance is lowered to a level at which the light-emitting element is off upon the forward vehicle having been detected, the luminance is gradually lowered in a shorter period of time than in a case in which the luminance is reduced to a level at which the light-emitting element remains on at reduced luminance.

When the luminance of each light-emitting element is raised to a level at which the light-emitting element is on at increased luminance, the control unit may gradually raise the luminance in a period that is substantially the same as the second period. In this case, regardless of whether the luminance is raised or lowered, when the luminance is changed to a level at which the light emitting element is on, the luminance is gradually changed in substantially the same period of time.

When the luminance of each light-emitting element is changed to a predetermined level at which the light-emitting element is on while the vehicle is traveling along a curve, the control unit may gradually change the luminance in a third period, which is longer than the first period and is shorter than or substantially equal to the second period. In this case, while the vehicle is traveling along a curve, even when the luminance is to be changed to a level at which the light-emitting element is on, the luminance is gradually changed in a relatively short period of time.

Another aspect of the present invention provides a vehicle lamp. This vehicle lamp includes a lamp unit that can combine light beams from a plurality of light-emitting elements to form a high-beam light-distribution pattern, and a driving circuit that turns on/off the plurality of light-emitting elements in response to a control signal that controls on/off of each of the plurality of light-emitting elements. Based on the control signal, the driving circuit controls each light-emitting element such that luminance thereof is gradually lowered in a first period when the luminance is lowered to a level at which the light-emitting element is off and controls each light-emitting element such that luminance thereof is gradually lowered in a second period, which is longer than the first period, when the luminance is lowered to a level at which the light-emitting element remains on at reduced luminance.

According to this aspect, although the luminance is gradually lowered in both cases, when the luminance is lowered to a level at which the light-emitting element remains on at reduced luminance, the luminance is gradually lowered in a longer period of time than in a case in which the luminance is reduced to a level at which the light-emitting element is off.

What is claimed is:

1. A vehicle lamp system, comprising:
    a lamp unit that is configured to combine light beams from a plurality of light-emitting elements to form a high-beam light-distribution pattern; and
    a control unit that controls on/off of each of the plurality of light-emitting elements,
    wherein, when luminance of each light-emitting element is to be lowered to a level at which the light-emitting element is off, the control unit controls the light-emitting element such that the luminance thereof is gradually lowered to the level at which the light-emitting element is off in a first period, and, when luminance of each light-emitting element is to be lowered to a level lower than a present level, the control unit controls the light-emitting element such that the luminance thereof is gradually lowered to the level lower than the present level in a second period longer than the first period.

2. The vehicle lamp system according to claim 1, further comprising:
    a detection unit that detects a forward vehicle,
    wherein, when the detection unit has detected a forward vehicle, the control unit controls, among the plurality of light-emitting elements, a light-emitting element that illuminates the forward vehicle such that luminance thereof is gradually lowered to a level at which the light-emitting element is off in the first period.

3. The vehicle lamp system according to claim 1, wherein, when the luminance of each light-emitting element is raised to a level at which the light-emitting element is on at increased luminance, the control unit gradually raises the luminance in a period that is substantially the same as the second period.

4. The vehicle lamp system according to claim 1, wherein, when the luminance of each light-emitting element is changed to a predetermined level at which the light-emitting element is on while the vehicle is traveling along a curve, the control unit gradually changes the luminance in a third period, which is longer than the first period and is shorter than or substantially equal to the second period.

5. A vehicle lamp, comprising:
- a lamp unit that is configured to combine light beams from a plurality of light-emitting elements to form a high-beam light-distribution pattern; and
- a driving circuit that turns on/off the plurality of light-emitting elements in response to a control signal that controls on/off of each of the plurality of light-emitting elements,
- wherein. when luminance of each light-emitting element is to be lowered to a level at which the light-emitting element is off, the driving circuit controls the light-emitting element such that the luminance thereof is gradually lowered to the level at which the light-emitting element is off in a first period based on the control signal, and, when luminance of each light-emitting element is to be lowered to a level lower than a present level, the driving circuit controls the light-emitting element such that the luminance thereof is gradually lowered to the level lower than the present level in a second period longer than the first period.

* * * * *